United States Patent [19]

Robinson

[11] 4,117,637
[45] Oct. 3, 1978

[54] CYCLIC SHEAR ENERGY ABSORBER

[76] Inventor: William Henry Robinson, 9 Nikau St., Eastbourne, New Zealand

[21] Appl. No.: 731,453

[22] Filed: Oct. 12, 1976

[30] Foreign Application Priority Data

Oct. 14, 1975 [NZ] New Zealand .......................... 178949

[51] Int. Cl.$^2$ ................................................ E04B 1/34
[52] U.S. Cl. ........................................................ 52/167
[58] Field of Search ................... 188/1 B, 1 C; 52/167, 52/393, 402, 573; 248/21, 22

[56] References Cited

U.S. PATENT DOCUMENTS

| 2,950,576 | 8/1960 | Rubenstein | 52/167 |
| 3,554,855 | 1/1971 | Dberst | 248/21 |

FOREIGN PATENT DOCUMENTS 885,017  12/1961  United Kingdom ...................... 52/167

OTHER PUBLICATIONS

Engineering-News Record, Apr. 23, 1959, p. 83.

Primary Examiner—John E. Murtagh
Attorney, Agent, or Firm—Holman & Stern

[57] ABSTRACT

A cyclic shear energy absorber interposed or to be interposed between members of a structure which may be caused by incoming energy to oscillate relative to each other. Such an absorber would have application in isolating a structure such as a building or nuclear power station from movements of its foundation caused by an earthquake. Similarly such an absorber could also dampen movement of a building caused by high wind. The absorber of the invention makes use of the fact that when a metal is plastically deformed, energy is absorbed. Lead which is the best example of such a material from a practical point of view is able to recover and recrystallize within a second or so, thus making the energy absorbing material available to absorb energy resulting from a relative movement opposite to that that caused the immediately preceding deformation under shear.

46 Claims, 13 Drawing Figures

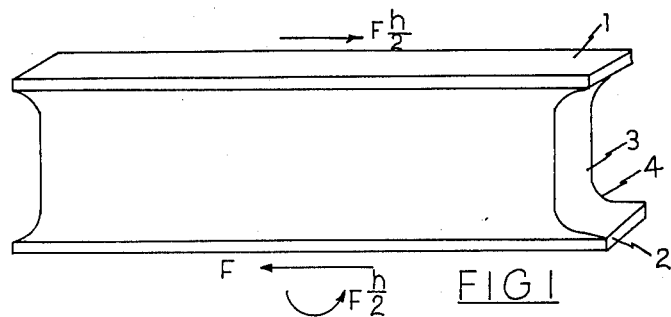
FIG 1
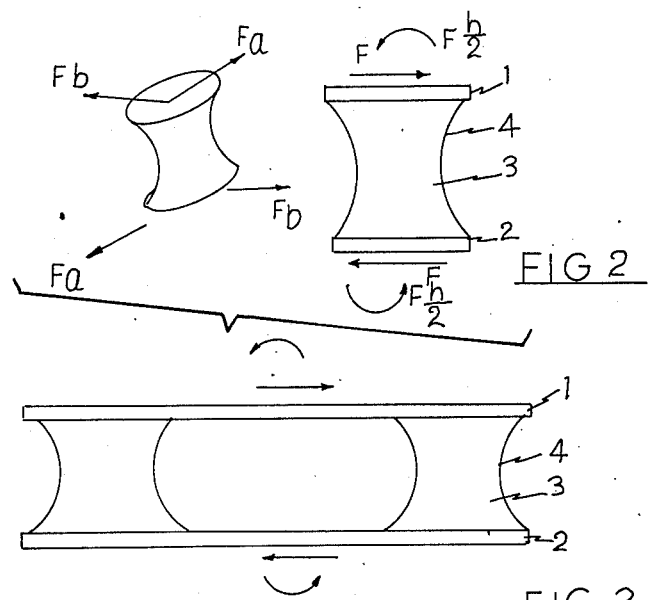
FIG 2
FIG 3
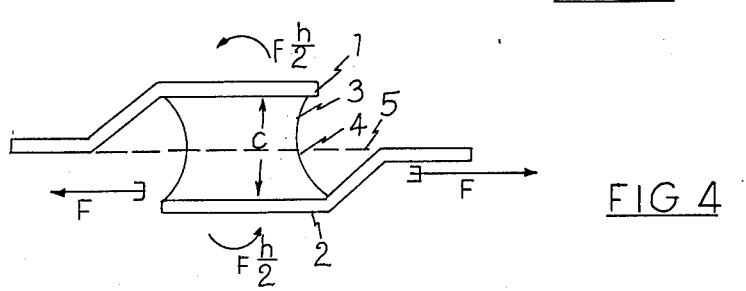
FIG 4
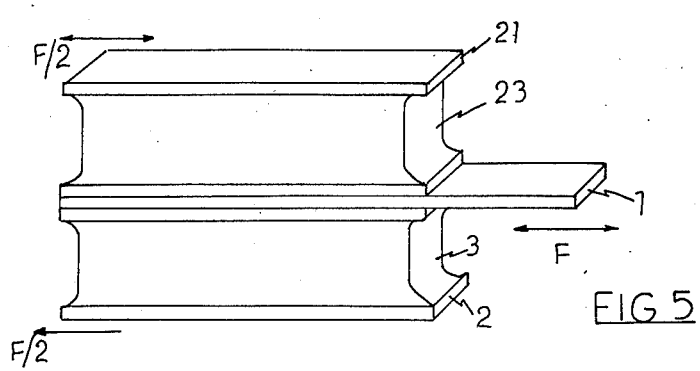
FIG 5

CYCLIC SHEAR ENERGY ABSORBER

BACKGROUND OF THE INVENTION (1) Field of the Invention

This invention relates to means that have been devised in order to absorb energy which would otherwise be passed between two members which are caused for example by an earthquake to move in cyclic manner relative to each other. It is therefore an object of the present invention to provide such an absorber, and a method of using such an absorber which will enable structural members or portions within a structure to be connected but in such a way that energy is absorbed to a reasonable degree before being passed from one to the other. Such an absorber preferably also is such that it can be replaced after prolonged use if the need arises.

(2) Description of the Prior Art

Energy absorbers, otherwise known as shock absorbers or dampers, are well known. There are many designs which will markedly reduce the energy, whether impact or cyclic, transmitted by forces of a few tens of newtons. These are, however, applications in which forces several orders greater than this may cause damage, especially when the structure oscillates. As one example only, we may consider the effect of a major earthquake or a high wind on a structure such as a tall building or a bridge. Forces now involved are tens of thousands of newtons or more, and it is well known that they may cause damage to the structure.

It is standard practice so to design structures that the energy transmitted to the building by such a natural phenomenon as an earthquake or a high wind is absorbed within the building by additional material which costs a considerable amount of money and is redundant from static considerations. To reduce this extra expense, attempts have been made to incorporate in the building special panels, commonly reinforced concrete, which are designed to be energy absorbers. It is known that the special concrete panels are expensive and that they will be destroyed in one or a few severe earthquakes or storms and will have to be replaced at appreciable expense. Various attempts have been made to prevent the transmission to the building of earthquake forces. In one such attempt, the building is mounted on rubber. It is often called a rubber damper but this is to a large extent a misnomer. A damper is an absorber of energy and a rubber support for a building absorbs very little energy, but operates as a spring.

Over the past few years, time has been spent developing means of absorbing energy of motion. These energy absorbers use the principle of twisting, bending or extruding a material to deform the device and hence absorb energy. Details of such developments can be found in the following list of publications, not all of which were published before the priority date of this patent specification:

(1) Robinson W H and Greenbank L R, "Properties of an Extrusion Energy Absorber", Bulletin of the New Zealand National Society for Earthquake Engineering, Vol. 8 p.187, 1975.

(2) Robinson W H and Greenbank L R, "An Extrusion Energy Absorber Suitable for the Protection of Structures during an Earthquake", Journal of Earthquake Engineering and Structural Dynamics, 1976.

(3) Skinner R K, Kelly J M, and Heine A J, "Hysteretic Dampers for Earthquake-resistant Structures", Journal of Earthquake Engineering & Structural Dynamics, Vol. 3, pp 287–296, 1975.

(4) Robinson W H, "Longitudinal Extrusion Energy Absorber" New Zealand Pat. No. 165897, December 1972, Australian Patent No. 463143, December 1972, U.S Pat. No. 3,833,093, December 1972, Mexican Pat. No. 132942, January 1973.

(5) Robinson W H, "Torsional Extrusion Energy Absorber" New Zealand Patent No. 172665, November 1974, U.S. Pat. No. 3,953,013, November 1974, British Patent Application No. 48532, November 1974. Japanese Patent application No. 133479, November 1974.

(6) Robinson W H, "Sleeve for Extrusion Energy Absorber", New Zealand Patent No. 175766, October 1975.

(7) Skinner, R I, Bycroft G N and McVerry G H, "A practical system for isolating Nuclear Power Plants from Earthquake Attack" Nuclear Engineering and Design 36 (1976) P287–297.

If a solid is taken cyclically beyond its elastic limit but short of failure, it will absorb energy. When used as a support for a building, or when used by incorporation in the structure of the building the energy transmitted to the building or through it, in the two cases, is converted into heat instead of being applied in a destructive fashion to the building. Materials are known which are useful in this way when deformed in torsion or in bending. No such energy absorbers are heretofore known which are so designed that the distortion of the energy absorbing element is in simple shear.

SUMMARY OF THE INVENTION

In a small number of materials, plastic deformation is not permanent. In lead, for instance, at ambient temperature (20° C.), the process of recovery and recrystallisation can take place in a second or so. In aluminum, the process can be equally quick at temperatures in the region of 200° C.

When a crystalline material, such as lead, plastically deforms, a proportion of the energy expended in the process appears immediately as heat. The remaining energy is stored in the deformed structure, and acts as the driving force which tends to return the material to the undeformed state, provided the material is at a temperature where the required reaction, recovery, recrystallisation and, or, grain growth can occur at a useful rate. Therefore, as the lead absorbs energy, its temperature will rise, having a two fold effect:

(a) as the temperature increases the yield stress decreases and, therefore, the energy absorbed decreases, (b) the higher the temperature the more rapidly the lead will recover and recrystallise.

These facts mean that the "shear" energy absorber using lead is a stable device at atmospheric temperatures and is less able to destroy itself than it would be if the absorbing elements were made of most other materials.

While lead is the most practicable material that has been located, it is not the only crystalline material which has a low rate of work hardening and a high resistance to fracture during cyclic deformation. Other materials besides lead include, aluminium, tin, zinc, brass, iron, steel and ice. Of these only lead, aluminium, the super plastic alloys and ice offer practical promise. The remainder has so high a shear strength that the supports for the absorbers and the connections to the structure would have to be so liberally designed that the absorber resulting would be too expensive to be attractive.

Lead, aluminium, ice and the super plastic alloys all have a low enough shear strength, that is to say, they are soft enough to enable economic design. Lead, aluminium and ice also have the property of recovery and recrystallisation during cyclic deformation. For aluminium these properties hold at temperatures (e.g. 200C) that are above the normal ambient range. Ice, obviously could only be used when the ambient temperature is appreciably below freezing point. Lead was, therefore, found to be the most useful material so far available. It has the power, during cyclic deformation into the plastic region, of recrystallisation and recovery continuously for periods likely to be required in an energy absorber.

Accordingly, in one aspect the present invention consists in a cyclic shear energy absorber to be interposed between members of a structure which may be caused by incoming energy to oscillate relative to each other, said absorber comprising a first portion engageable to one member of the structure and a second portion spaced from said first portion which is engageable to a different member of said structure, said different member being one that may be caused to oscillate relative to the member to which said first portion is engaged, there being strainable cyclically in shear between said two portions at least one member constructed from a material which has a low rate of work hardening and a high resistance to fracturing during cyclic plastic deformation at the ambient temperature at which the absorber is to be installed.

In a further aspect, the invention consists in a cyclic shear energy absorber to be interposed between a structural member of a building and a supporting structure therefor, said absorber comprising a first portion attachable to said structural member and a second portion spaced therefrom attachable to said supporting structure, and at least partly resilient weight bearing member located between said first and second portions and fixed thereto, and at least one mass of lead constrained within said at least partly resilient weight bearing member and spanning between said first and second portion to each of which it is attached.

In a further aspect the invention consists in a building mounted on a foundation which includes operatively interposed between structural members of said building and the supporting members of said foundation at least one cyclic shear energy absorber comprising a first portion engaged to a said structural member and a second portion spaced from said first portion which is engaged to a said supporting member, said supporting member being one that can be caused to oscillate relative to the structural member to which said first portion is engaged, there being strainable cyclically in shear between said two portions at least one member constructed from a material which has a low rate of work hardening and a high resistance to fracturing during cyclic plastic deformation at the ambient temperature at which the absorber is installed.

In still a further aspect the present invention consists in a building comprising a cyclic shear energy absorber to be interposed between a structural member of a building and a supporting structure therefor, said absorber comprising a first portion attachable to said structural member and a second portion spaced therefrom attachable to said supporting structure, and at least partly resilient weight bearing member located between said first and second portions and fixed thereto, and at least one mass of lead constrained within said at least partly resilient weight bearing member and spanning between said first and second portion to each of which it is attached.

In yet a still further aspect the invention consists in a building mounted on a foundation which includes operatively interposed between structural members of said building and the supporting members of said foundation at least one cyclic shear energy absorber, said at least one absorber comprising a first portion attached to a said structural member of the building and a second portion spaced therefrom attached to said supporting members, an at least partly resilient weight bearing member located between said first and second portions and at least one mass of lead constrained within said at least partly resilient weight bearing member and spanning between said first and second portion to each of which it is attached.

In still a further aspect the invention consists in a structure which includes a first structural portion and a second structural portion, damped with regard to cyclic movement relative thereto, said structure comprising a member of said first structural portion capable of at least limited movement with respect to a member of said second structural portion, and a cyclic shear energy absorber operatively interposed therebetween to dampen any relative movement, said absorber comprising a first portion engaged to the said member of said first structural portion and a second portion spaced from said first portion which is engaged to the said member of said second structural portion, there being strainable cyclically in shear between said two portions at least one member constructed from a material which has a low rate of work hardening and a high resistance to fracturing during cycle plastic deformation at the ambient temperature at which the absorber is installed.

In a further aspect the invention consists in a structure which includes a first structural portion and as second structural portion damped with regard to cyclic movement relative thereto, said structure comprising a member of said first structural portion capable of at least limited movement with respect to a member of said structural portion, and a cyclic shear energy absorber interposed therebetween to dampen any relative movement, said absorber comprising a first portion attached to the said member of said first structural portion and a second portion spaced therefrom attached to the said member of said second structural portion, an at least partly resilient weight bearing member located between said first and second portions which bears at least some of the weight of uppermost of the two structural portions, and at least one mass of lead constrained within said at least partly resilient weight bearing member and spanning between said first and second portion to each of which it is attached.

Suitable materials would be lead, aluminium, and ice.
Preferably the material is lead.

In a further aspect the invention consists in a cyclic shear energy absorber interposed between a structural member of a building and a supporting structure therefor, said absorber comprising a first portion attached to said structural member and a second portion spaced therefrom attached to said supporting structure, an at least partly resilient weight bearing member located between and contacting said first and second portions and at least one mass of lead constrained within said at least partly resilient weight bearing member which is capable of being caused to plastically deform and absorb energy when there is a relative horizontal movement between said structural member of said building and the supporting structure therefor which results in relative movement between said first and second portions which deforms said weight bearing member.

BRIEF DESCRIPTION OF THE DRAWINGS

FIGS. 1, 2 and 3 show embodiments of the present invention adapted for the absorption of energy in shear when the applied forces are longitudinal.

FIG. 4 is used in the explanation of the relation between longitudinally applied forces and bending moment.

FIGS. 5, 6 and 7 show methods of applying the absorbers of FIGS. 1, 2 and 3.

DESCRIPTION OF PREFERRED EMBODIMENT

Figure 6:
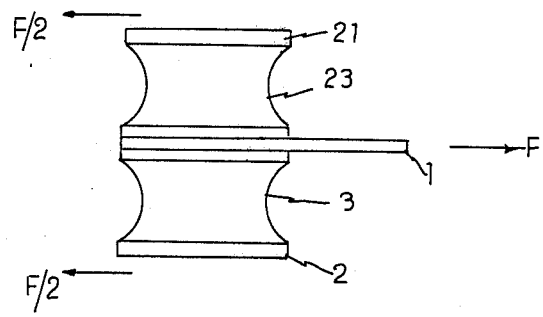

For an easy understanding of the principle of the present invention, a strip of material should be taken and held firmly at both ends, and then be pushed backwards and forwards. If the strip is thin, pushing it backwards and forwards will cause it to bend and there will be a certain amount of shear. If the strip is thicker bending will be less and shear greater. This shear will cause the material to deform. In most materials, the internal deformation is, at atmospheric temperatures, stable enough to be considered permanent. In a small number of materials the internal deformation is not permanent. In lead at normal atmospheric temperatures the processes of recovery and recrystallization can take place in a second or so. In aluminium the process can be equally quick at temperatures in the general neighbourhood of 200° C. Other materials have a similar property but the number that recover and recrystallize at room temperatures is quite limited.

The successful operation of the present energy absorber using a material such as lead rests on one or more of three inter-related processes, recovery, recrystallization and grain growth. When crystalline materials plastically deform a proportion of the energy expended in the process appears immediately as heat, but some is stored in the deformed structure. This stored energy acts as the driving force which tends to return the material to the underformed state with the release of heat, provided the material is at a temperature where the required reaction, recovery, recrystallization and/or grain growth, — can occur at a useful rate. A cyclic energy absorber of the present type requires a plastically deformable material in which one or more of these processes takes place spontaneously and quickly at the operating temperature of the device so that the mechanical properties of the material are essentially the same over each cycle. It is envisaged that the present invention can be used to absorb the energy of a vibrating structure such as a tall building. Lead, the preferred choice of material of the present invention, has a time constant, depending on conditions, of about 1 second for recovery of its original mechanical properties. The greater the rate at which the lead is deformed the faster it will recrystallize.

As the lead absorbs energy its temperature will rise. The effect of an increase in temperature is twofold:
(a) as the temperature increases the yield stress decreases and therefore the energy absorbed decreases,
(b) the higher the temperature the more rapidly the lead will recover and recrystallize.

These facts mean that the shear absorber using lead is a stable device at atmospheric temperature, and is less able to destroy itself than it would be if the absorbing elements were made of most other materials.

In the embodiments to be described when it is used to absorb the energy from a building which has a periodicity of the order of seconds, the heating of the deformable material, in this case lead, will not be such as to cause melting however long the process is continued. It is a particular advantage of the small class of materials of which lead is the prime example that straining into the plastic state induces dislocations which accommodate the deformation rather than internal cracks which propagate.

The present invention is intended to protect buildings and to remove from the energy induced by an earthquake or a high wind which might otherwise be destructive. Put in another way the present invention is intended to limit the amplitude of oscillation of a structure. When a structure oscillates parts of it move relative to other parts, e.g. if a frame is oscillating in its plane by the application of a force to an edge or a corner, at a given moment one diagonal will be extended and the opposed diagonal compressed. At the opposite phase of oscillation the two will reverse. It is possible then to bring together connections from two parts of the structure so placed that the connections will move relative to each other during the oscillation of the building. There are of course many variants of this simple concept, but an absorber which joins together the two connecting rods will absorb energy from the whole structure. Unlike a spring it will not return to the structure the energy it has absorbed. Unlike a dashpot its rate of absorption of energy will not be critically dependent on velocity.

The example quoted in the previous paragraph is one in which the force to be applied to the absorber is longitudinal and uni-axial. There are two forces cyclically opposed, in line with each other. FIG. 1 shows an isometric view of an absorber designed for this application. There are two plates, 1 and 2 which must be stiff compared with the absorbing material, assumed for the present to be lead. This is shown at 3. The force which conveys the energy to be absorbed is applied in antiphase where shown by the two arrows. It will be noticed that at for instance, 4, the corners of the absorbing body 3 are splayed, so that the area of material 3 in contact with the plates 1 and 2 is greater than the area at the mid section of 3. The reason for this is explained by FIG. 4. This device is intended to operate in shear and not in bending. It was explained earlier that if a strip is deflected it will be bent and will be stressed in shear and that the thicker it is the more shear there will be. The working part of a shear absorber then must be short and thick. In FIG. 1 the height $h$ is the shortest distance between plates 1 and 2 and the thickness is the dimension of the material 3 which is perpendicular to this dimension and parallel to the force. For an absorber to work in shear, the two opposed applied forces should be as nearly uni-axial as possible. This would normally be necessary in the structure but it is also a requirement to reduce to a minimum the bending of the absorber which is intended to work in shear. At the absorber, the lines of the two forces must clearly be separated by whatever is the distance between plates 1 and 2 or no absorbing material can be present. FIG. 4 demonstrates that, so far as the structure is concerned, it is possible to oppose forces uni-axially. At each end of the absorber itself, there is not only the shear force, but there is also a moment equal to $(F \times H)/2$ about the neutral axis 5, where the distance between the two plates of the absorber is $h$. At the mid-plane of the absorber the bending moment is zero while the shear force is F. In designing the absorber, then, some notice must be taken of the bending moment that will be applied to it or the distribution of maximum shear stress will not be uniform. The curvature shown at 4 in FIG. 2 is the means of dealing with this. It is possible in any given case, using well known concepts of structural design, to determine the curvature that is required, that curvature being a result of a variation of required area with distance from the nearest plate 1 or 2. The curvature can be applied to two or four sides.

The next stage of the application of forces to the two ends of a shear absorber is shown at FIG. 2. In this case the forces are still longitudinal, but, as is shown by $F_a$ and $F_b$, they may be at any direction within a given plane. The best shape of absorber for dealing with this situation is shown in FIG. 2. It is in general similar to what is shown in FIG. 1 except that in horizontal cross-section it is circular.

The pattern of FIG. 2 can be applied to the situation of FIG. 1 by using two absorbers which are circular in cross-section. This is shown in FIG. 3. FIG. 3 may also be taken to represent an end view of an array of symmetrically placed absorbers. This would be suitable for the situation of FIG. 2.

Figure 7:
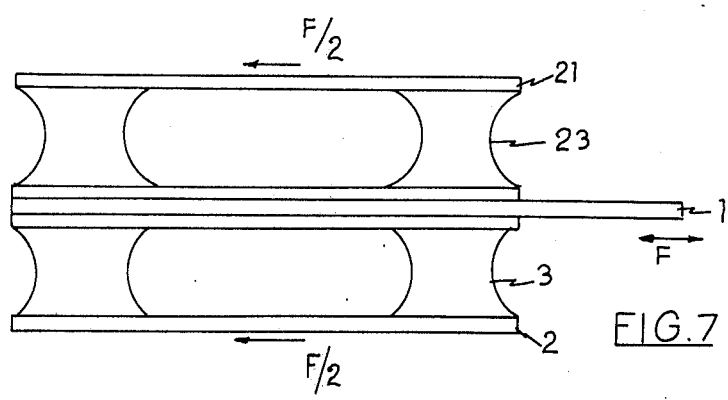

FIGS. 5, 6 and 7 show methods of applying the absorbers of FIGS. 1, 2 and 3 in a second method of removing from the structure itself the couple which is introduced by the space between plates 1 and 2. In each case an absorber or set of absorbers according to FIGS. 1, 2 and 3 is placed axially in line over a similar absorber or set of absorbers. The means for applying force 1 is now applied equally to two aborbing elements 3 and 23. The opposed force, by yoke or otherwise, is divided equally and is applied to the outer force-applying members 2 and 21.

Figure 10:
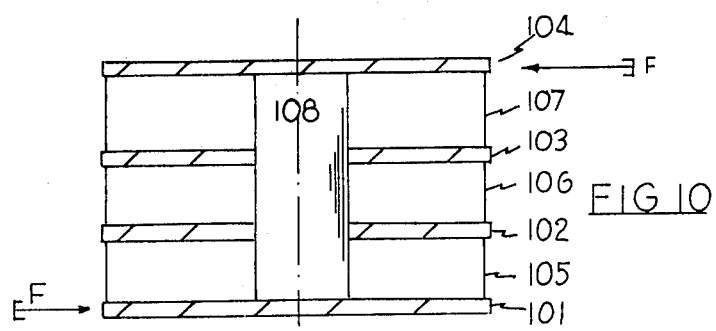
FIG. 10 shows a possible combination of an absorber according to the present invention with a conventional support pad.

It may sometimes be desirable to use an absorber of the present pattern in conjuncton with a rubber bearing pad of the kind already discussed. An example of how this could be done is shown in FIG. 10. Parts 101, 102, 103, 104 are plates, commonly of steel and parts 105, 106, 107 are rubber discs. According to conventional practice, these parts would be bonded into a single structure. As has already been explained this structure behaves as if it were a spring and will return when the force is removed, but it absorbs little energy. To give the rubber block an energy absorbing capacity, one or more pillars (108) of lead can be fitted between plates 101 and 104. This pillar is a true absorber of cyclic energy.

Figure 8:
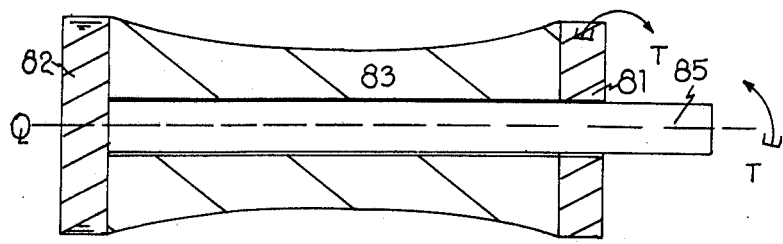
FIGS. 8 and 9 show two possible embodiments of the invention when the applied stresses are torsional.

The discussion so far has assumed forces in a line or plane, that is to say without rotation. Now consider the situation when shear is applied in torsion using a simple illustration. In this case we take a rod of a plastic material and twist its ends in opposite directions. FIG. 8 shows a possible form of a torsional shear absorber using the same principles and the same material as have been discussed for longitudinal shear. Instead of plate 1, we have plate 81. This can conveniently be a disc and be made of mild steel. Passing through a clearance hole in the middle of it is a rod 85. This applies a torque to a second plate or disc 82. Between 81 and 82, and firmly fixed to both of them but not to rod 85, is absorbing member 83, made of one of the class of materials, probably lead, already discussed. When opposed cyclic torques are applied to rod 85 and plate 81, energy is absorbed in element 83.

Figure 9:
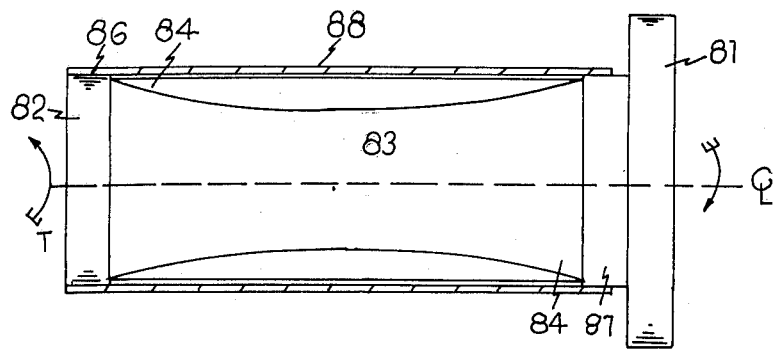

FIG. 9 shows a variant pattern of FIG. 8. Once more a torque is applied to plate 81. In this embodiment the opposed torque is applied directly to plate 82. Between the outer edge 86 of plate 82 and a flange 87 firmly attached to plate 81 is a sleeve 88 firmly fixed to plate 82 and forming a bearing on flange 87.

The purpose of rod 85 and of sleeve 88 is to keep the two ends of element 83, already defined as being a plastic material, in line.

Once more the cross-sectional area of element 83 is increased at 84 towards its points of attachment to ensure a uniform deformation.

The method of attaching the absorbing bodies so far used is to interpose between the origin of force and the end of the body a plate of steel to which the absorbing body is soldered. Solder does not readily adhere to steel and it has been found necessary to increase the diameter of the ends of cylinders, or of the ends of blocks to compensate for the reduction of strength at the soldered joints.

Tests have been carried out on the embodiments defined by FIGS. 5 and 6, using lead as the absorbing material. The strain of the lead in each case depends on the relation between the mutual excursion of the tie rods and the distance between them which is occupied by lead.

Figure 11:
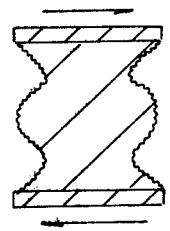
FIGS. 11 and 12 show, exaggerated and in cross-section a form of deformation observed when an absorber of the present pattern was heavily loaded.
Figure 12:
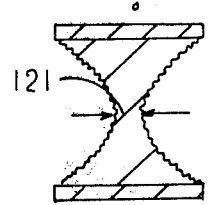

FIGS. 11 and 12 show, in an exaggerated fashion, an effect to which no reference has been found in the literature. When cyclic strain is applied for a long time to a lead absorber, the lead is found to migrate. In FIG. 11 opposed linear cyclic forces are applied to the top and bottom of the absorber, in the plane of the paper. FIG. 12 is a view of the same absorber when the forces are applied into and out of the plane of the paper. In a typical case the minimum width 121 shown in FIG. 2 is one-fourth of the original width.

From the foregoing general description with reference to FIGS. 1 to 12 of the drawings, it can be seen that the absorbers of the present invention offer considerable promise. It is anticipated however that the most common type of absorber formed in accordance with the present invention will be those which are capable of absorbing energy in all directions, for example it should not only be able to absorb energy in any direction on a horizontal plane, but it should also be capable of absorbing energy in a vertical direction. It has been found that all of the absorbers of the present invention are capable of absorbing energy under compression or tension between the plates.

It is seen from the foregoing therefore that the most likely types of absorber will be the unconstrained round, the unconstrained rectangular or a constrained version of either which need not necessarily be round or waisted which is constrained by some flexible material such as rubber pads, with or without metal plates. To understand therefore the designing of such unconstrained absorbers the following theoretical considerations and experimental data should be considered. The following data also takes in to account theoretical considerations and experimentation in regard to the rectangular absorbers of the present invention.

THE ROUND ABSORBER

To see the effect of work done on an absorber, specimens were cycled at various strokes, to observe failure.

These absorbers were not shaped but parallel sided, soldered to brass plates. The results showed that most of the fatigue was apparent at the base, and it was at this point that the majority of the work was being focused. To overcome the loading at the base, a curvature was given to the sides of the absorber. This curve spreads the load evenly throughout its working length and should therefore increase the life by making more lead available to do the work.

RECTANGULAR ABSORBERS

The same method was adopted for the rectangular shear absorbers. Again some sort of curvature seemed needed either at its ends of along its length.

TESTING OF DESIGN

Figure 13:
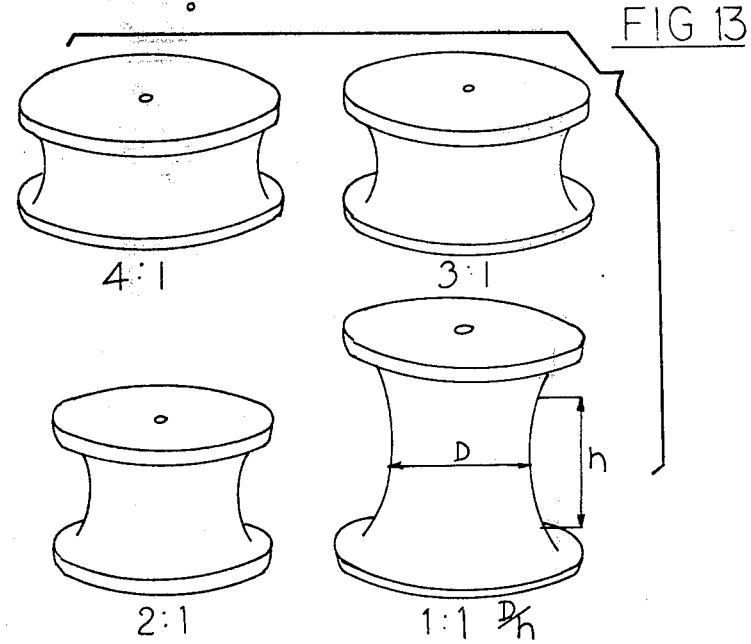
FIG. 13 shows four waisted energy absorbers having a D/h ratio of 4:1, 3:1, 2:1 and 1:1 from left to right respectively, the ratio D/h being substantially as hereinafter defined.

Absorbers having a curvature were made (FIG. 13) and, the maximum quarter cycle for the absorbers were obtained. Results were obtained as follows:

| $\frac{D}{h}$ | D (mm) | h (mm) | $\Delta x$ (mm) | $\frac{\Delta x}{D}$ | $\frac{D}{\Delta x}$ | $\frac{\Delta x}{h}$ | Max. Load (kg) | $\sigma_{12}$ (kg/mm$^2$) |
|---|---|---|---|---|---|---|---|---|
| 1:1 | 24 | 24 | 30.0 | 1.25 | 0.80 | 1.25 | 620 | 1.37 |
| 2:1 | 40 | 20 | 29.2 | 0.73 | 1.37 | 1.46 | 1550 | 1.23 |
| 3:1 | 51 | 17 | 30.4 | 0.59 | 1.67 | 1.79 | 2437 | 1.19 |
| 4:1 | 51.6 | 12.6 | 26.2 | 0.51 | 1.97 | 2.08 | 2563 | 1.23 |
| 10:1 | 55 | 5.5 | 14.0 | 0.25 | 3.93 | 2.55 | 3000 | 1.26 | where
D = Diameter at centre
h = Working height
$\Delta x$ = Extension
$\sigma_{12}$ = Shear stress From the results it is possible to calculate the maximum stroke available for different applications, e.g. if a 15 cm stroke is required, the diameter for a 1:1 absorber is $0.80 \times 15 = 12$ cm. For a 2:1 it is $1.37 \times 15$ etc. the values being taken from the fourth column.

Maximum force can also be calculated as the shear stress of lead is $\approx 126$ kg/cm$^2$.

THE EFFECT OF CYCLING ON A ROUND ABSORBER

Once a maximum usable extension has been found it is necessary to observe the effect of cycling to see if any design changes would have to be made. The tests consisted of mounting two absorbers in a rig and cycling them in an Instron Testing Machine at various strokes and speeds until failure occurred.

The first cycling experiment was carried out on two 2:1 26 cm diameter absorbers cycled at $\pm \frac{1}{2}$ maximum stroke.

The following data was obtained

| Stroke | = $\pm 9.5$ mm |
|---|---|

| -continued | | |
|---|---|---|
| Max. load at | 1 cycle | = 1600 kg |
| " | 10 cycles | = 1200 kg |
| " | 20 cycles | = 1100 kg |
| " | 30 cycles | = 1000 kg |
| " | 40 cycles | = 900 kg |
| " | 50 cycles | = 800 kg |

Failure occurred between 50–60 cycles.

Failure occurred by what could be described as a "pumping action" of lead from the centre outwards. This has the effect of making the centre long and thin in the direction of movement.

A similar experiment was carried out on absorber of 3:1 dimensions to see if the effect was still noticeable, as a greater amount of shear, and less bending will take place as the ratios increase. The results obtained showed that the pumping action was more severe than in the 2:1 absorber causing failure to occur at between 40–50 cycles.

As the pumping action warranted more investigation, experiments designed to find a relationship between stroke, speed and pumping action were devised whereby several 1:1 absorbers were subjected to cycling strokes of $\frac{1}{4}$, $\frac{1}{2}$, $\frac{3}{4}$ and maximum. (FIG. 25).

The results showed that the pumping action was more noticeable for stroke values of $\frac{1}{2}$ maximum and above. Below this, the failure occurs at the ends, or equally at the ends and centre. The most efficient stroke was $\frac{1}{4}$ maximum, as this causes the whole of the lead to be worked. This is in contrast to the $\frac{3}{4}$ maximum and above which causes immediate central necking and consequent failure. In the case of a maximum stroke the lifetime is very short, say of the order of three cycles with all the work being concentrated in the central region.

Throughout all the experiments, hysteresis loops were obtained to observe the energy consumed by the absorber.

PRELIMINARY TESTING OF FULL-SIZED ABSORBERS

A pair of round absorbers were made having basic construction of 2:1. Nominally the diameter was 102 mm and the height 50 mm. The absorber's maximum stroke was $\pm$ 76 mm requiring a maximum force of 11000 kg. These were placed in a test rig together with rubber bearings and cycled at one cycle per second until noticeable working had taken place. From results obtained, the soldered joint showed no signs of fatigue and it must be assumed that this is a practical way to attach the lead absorber. A total of 70 cycles were completed successfully.

The speed at which the absorber was cycled did not have any adverse effect on performance as could have been the case. The only difference appeared to be the heat rise of the lead (75° C.).

The foregoing detailed experimental consideration has not been extended to constrained constructions which it is anticipated will probably be the commercial form of the invention. As shown in FIG. 10 such a constrained piece of the material, preferably lead, need not be waisted although it can, if in fact there are bonding difficulties with the plates at each end. It is believed therefore that in due course commercial bearing pads for buildings will be made available which include at least one energy absorbing mass of lead or some equivalent material contained and constrained therein. Of course a number of the same could be fitted and the life of such a unit would be almost indefinite. Of course while a variety of constrained supporting pads could be used some unconstrained mass could also be used to provide some visual indication of the amount of work that has been done by the bearing pads.

The application that is forseen for energy absorbers of the present invention appears mainly to lie in the field of earthquake protection especially in regard to nuclear power stations, bridges, tall buildings and the like. Hence they can be used in a known manner as a base isolation device between the ground and the structure of the building thus providing a flexible mounting after a certain driving force is achieved. They can also be provided as a flexible damping unit between structures, for example, between portions of a long building.

The rectangular shear absorbers of the present invention are only truly suitable for attack in one direction, although they do have some applicability to attack in other directions. They are ideally for use in a structural frame, e.g. stepping actions, where obviously any movement will be more or less restricted to one direction.

The absorbers of the present invention therefore do have wide application. One great advantage of the unconstrained lead absorber is that there is a visual indication when the lead is reaching failure and hence the end of its useful life. This visual aspect should prove to be an asset to the engineer as it shows immediately if one particular member of a building or structure is being subjected to greater movements. Also by taking the shearing process and applying it to a torsional device, a torsional shear absorber is obtained which would have uses in regard to rope drums, winches, lift shafts etc. Also all of the absorbers of the present invention could be used to isolate equipment from vibration or from causing vibration to a structure. Hence in that sense any mass that is to be isolated from another mass is a "structure" within the use of the term throughout the present specification and in the appended claims. It is seen therefore that such absorbers are useful in absorbing the energy of unwanted modes of motion and the use for it may well be extended to assist in damping the rolling of a ship or oscillation of a train.

What I claim is:

1. A cyclic shear energy absorber to be interposed between members of a structure which may be caused by incoming energy to oscillate relative to each other, said absorber comprising a first portion engagable to one member of the structure and a second portion spaced from said first portion which is engagable to a different member of said structure, said different member being one that may be caused to oscillate relative to the member to which said first portion is engaged, there being fixed in a sandwich-like manner plastically strainable cyclically in shear between said two portions at least one member of lead, the cross-section of said lead in a plane substantially parallel to the sandwich-like arrangement of said lead and said two portions is substantially rectangular and at least one of the sides of the cross-sectional area is smaller adjacent the center of the lead in the sandwich-like arrangement.

2. An absorber as claimed in claim 8 wherein the cross-section is smaller at the centre of said sandwich like arrangement than at the portion of said lead that makes contact with and is attached to either of said first and second portions.

3. An absorber as claimed in claim 2 wherein the lead is in the form of a waisted round length which spans between said first and second portions.

4. An absorber as claimed in claim 3 wherein said first and second portion is each substantially plate like.

5. An absorber as claimed in claim 1 wherein each of said first and second portion is substantially plate like.

6. An absorber as claimed in claim 3 wherein the waist like configuration includes a central belt of increased cross-section than would be the case if in fact the waisting was perfect.

7. An absorber as claimed in claim 1 wherein said first portion is constrained by means to be rotatable relative to said second portion, said lead being attached to said first and said second portion so as to enable the torsional absorption of energy.

8. A cyclic shear energy absorber to be interposed between members of a structure which may be caused by incoming energy to oscillate relative to each other, said absorber comprising a first portion engagable to one member of the structure and a second portion spaced from said first portion which is engagable to a different member of said structure, said different member being one that may be caused to oscillate relative to the member to which said first portion is engaged, there being fixed in a sandwich-like manner plastically strainable cyclically in shear between said two portions at least one member of lead, the cross-section of said lead in a plane substantially parallel to the sandwich-like arrangement of said lead and said two portions is substantially circular.

9. An absorber as claimed in claim 4 wherein said lead is substantially circular in cross-section with respect to a plane parallel to said plates and the diameter D thereof at the centre of said waisting to the axial length of the waisted region $h$ gives a ratio $D/h$ of from 4:1 to 1:3.

10. An absorber as claimed in claim 9 wherein said ratio $D/h$ is about 2:1.

11. An absorber as claimed in claim 9 wherein said ratio $D/h$ is about 1:1.

12. An absorber as claimed in claim 9 wherein $D/h$ is about 1:2.

13. A cyclic shear energy absorber to be interposed between a structural member of a building and a supporting structure therefor, said absorber comprising a first portion attachable to said structural member and a second portion spaced therefrom attachable to said supporting structure, an at least partly resilient weight bearing member located between said first and second portions and at least one mass of lead constrained within said at least partly resilient weight bearing member and spanning between said first and second portion to each of which it is attached wherein any significant relative movement between said first and second portions will result in the plastic deformation of said at least one mass of lead, said at least partly resilient weight bearing member including two rubber pads with at least one metal plate interposed therebetween, each of said first and second portions includes a metal plate to each of which said at least one mass of lead is fixed, and said at least one mass of lead is shaped to have a substantially circular cross-section in a plane parallel to the metal plates of the absorber which are mutually substantially parallel.

14. An absorber as claimed in claim 13 wherein there is only one mass of lead.

15. An absorber as claimed in claim 13 wherein said at least one mass of lead is soldered to said first and second portions.

16. An absorber as claimed in claim 8, wherein said first portion is constrained by means to be rotatable relative to said second portion, said lead being attached to said first and second portion so as to enable the torsional absorption of energy.

17. A building mounted on a foundation which includes operatively interposed between structural members of said building and the supporting members of said foundation at least one cyclic shear energy absorber comprising a first portion engaged to a said structural member and a second portion spaced from said first portion which is engaged to a said supporting member, said supporting member being one that can be caused to oscillate relative to the structural member to which said first portion is engaged, there being fixed in a sandwich-like manner plastically strainable cyclically in shear between said two portions at least one member of lead, the cross-section of said lead in a plane substantially parallel to the sandwich-like arrangement of said lead and said two portions is substantially rectangular and at least one of the sides of the cross-sectional area is smaller adjacent the center of the lead in the sandwich-like arrangement.

18. A building mounted on a foundation which includes operatively interposed between structural members of said building and the supporting members of said foundation at least one cyclic shear energy absorber comprising a first portion engaged to a said structural member and a second portion spaced from said first portion which is engaged to a said supporting member, said supporting member being one that can be caused to oscillate relative to the structural member to which said first portion is engaged, there being fixed in a sandwich-like manner plastically strainable cyclically in shear between said two portions at least one member of lead, the cross-section of said lead in a plane substantially parallel to the sandwich-like arrangement of said lead and said two portions in substantially circular.

19. A building as claimed in claim 18 wherein the cross-section is smaller at the centre of said sandwich like arrangement than at the portion of said lead that makes contact with and is attached to either of said first and second portions.

20. A building as claimed in claim 19 wherein the lead is in the form of a waisted round length which spans between said first and second portions.

21. A building as claimed in claim 20 wherein said first and second portion is each substantially plate like.

22. A building as claimed in claim 19 wherein the waist like configuration includes a central belt of increased cross-section than would be the case if in fact the waisting was perfect.

23. A building as claimed in claim 20 said lead is substantially circular in cross-section with respect to a plane parallel to said plates and the diameter D thereof at the centre of said waisting to the axial length of the waisted region $h$ gives a ratio $D/h$ of from 4:1 to 1:3.

24. A building as claimed in claim 23 wherein said ratio $D/h$ is about 2:1.

25. A building as claimed in claim 23 wherein said ratio $D/h$ is about 1:1.

26. A building as claimed in claim 23 wherein $D/h$ is about 1:2.

27. A building mounted on a foundation which includes operatively interposed between structural members of said building and the supporting members of said foundation at least one cyclic shear energy absorber, said at least one absorber comprising a first portion attached to a said structural member of the building and a second portion spaced therefrom attached to said supporting members, an at least partly resilient weight bearing member located between said first and second portions and at least one mass of lead constrained within said at least partly resilient weight bearing member and spanning between said first and second portion to each of which it is attached wherein any significant relative movement between said first and second portions will result in the plastic deformation of said at least one mass of lead, said at least partly resilient weight bearing member including two rubber pads with at least one metal plate interposed therebetween, each of said first and second portions includes a metal plate to each of which said at least one mass of lead is fixed, and said at least one mass of lead is shaped to have a substantially circular cross-section in a plane parallel to the metal plates of the absorber which are mutually substantially parallel.

28. A building as claimed in claim 27 wherein there is only one mass of lead.

29. A building as claimed in claim 27 wherein said at least one mass of lead is soldered to said first and second portions.

30. A building as claimed in claim 29 wherein said mass of lead has its said substantially circular cross-section waisted at the centre thereof between said first and second portion.

31. A structure which includes a first structural portion and a second structural portion, damped with regard to cyclic movement relative thereto, said structure comprising a member of said first structural portion capable of at least limited movement with respect to a member of said second structural portion and a cyclic shear energy absorber operatively interposed therebetween to dampen any relative movement, said absorber comprising a first portion engaged to said member of said first structural portion and a second portion spaced from said first portion which is engaged to said member of said second structural portion, there being fixed in a sandwhich-like manner plastically strainable cyclically in shear between said two portions at least one member of lead, the cross-section of said lead in a plane substantially parallel to the sandwich-like arrangement is substantially rectangular and at least one of the sides of the cross-sectional area is smaller adjacent the center of the lead in the sandwich-like arrangement.

32. A structure as claimed in claim 31 wherein said first portion is constrained by means rotatable relative to said second portion, said lead being attached to said first and said second portion so as to enable the torsional absorption of energy.

33. A structure which includes a first structural portion and a second structural portion, damped with regard to cyclic movement relative thereto, said structure comprising a member of said first structural portion capable of at least limited movement with respect to a member of said second structural portion and a cyclic shear energy absorber operatively interposed therebetween to dampen any relative movement, said absorber comprising a first portion engaged to said member of said first structural portion and as second portion spaced from said first portion which is engaged to said member of said second structural portion, there being fixed in a sandwich-like manner plastically strainable cyclically in shear between said two portions at least one member of lead, the cross-section of said lead in a plane substantially parallel to the sandwich-like arrangement is substantially circular.

34. A structure as claimed in claim 33 wherein the cross-section is smaller at the centre of said sandwich-like arrangement than at the portion of said lead that makes contact with and is attached to either of said first and second portions.

35. A structure as claimed in claim 34 wherein the lead is in the form of a waisted round length which spans between said first and second portions.

36. A structure as claimed in claim 35 wherein said first and second portion is each substantially plate like.

37. A structure as claimed in claim 34 wherein the waist like configuration includes a central belt of increased cross-section than would be the case if in fact the waisting was perfect.

38. A structure as claimed in claim 35 wherein said lead is substantially circular in cross-section with respect to a plane parallel to said plates and the diameter D thereof at the centre of said waisting to the axial length of the waisted region $h$ gives a ratio $D/h$ of from 4:1 to 1:3.

39. A structure as claimed in claim 38 wherein said ratio $D/h$ is about 2:1.

40. A structure as claimed in claim 38 wherein said ratio $D/h$ is about 1:1.

41. A structure as claimed in claim 38 wherein $D/h$ is about 1:2.

42. A structure which includes a first structural portion and a second structural portion damped with regard to cyclic movement relative thereto, said structure comprising a member of said first structural portion capable of at least limited movement with respect to a member of said structural portion, and a cyclic shear energy absorber interposed therebetween to dampen any relative movement, said absorber comprising a first portion attached to the said member of said first structural portion and a second portion spaced therefrom attached to the said member of said second structural portion, an at least partly resilient weight bearing member located between said first and second portions which bears at least some of the weight of uppermost of the two structural portions, and at least one mass of lead constrained within said at least partly resilient weight bearing member and spanning between said first and second portion to each of which it is attached wherein any significant relative movement between said first and second portions will result in the plastic deformation of said at least one mass of lead, said at least partly resilient weight bearing member including two rubber pads with at least one metal plate interposed therebetween, each of said first and second portions includes a metal plate to each of which said at least one mass of lead is fixed, and said at least one mass of lead is shaped to have a substantially circular cross-section in a plane parallel to the metal plates of the absorber which are mutually substantially parallel.

43. A structure as claimed in claim 42 wherein there is only one mass of lead.

44. A structure as claimed in claim 42 wherein said at least one mass of lead is soldered to said first and second portions.

45. The structure as claimed in claim 33, wherein said first portion is constrained by means rotatable relative to said second portion, said lead being attached to said first and second portion so as to enable the torsional absorption of energy.

46. A cyclic shear energy absorber interposed between a structural member of a building and a supporting structure therefor, said absorber comprising a first portion attached to said structure member and a second portion spaced therefrom attached to said supporting structure, an at least partly resilient weight bearing member located between and contacting said first and second portions and at least one mass of lead constrained within said at least partly resilient weight bearing member which is capable of being caused to plasticly deform and absorb energy when there is a relative horizontal movement between said structural member of said building and the supporting structure therefor which results in relative movement between said first and second portions which deforms said weight bearing member, said at least partly resilient weight bearing member including two rubber pads with at least one metal plate interposed therebetween, each of said first and second portions includes a metal plate to each of which said at least one mass of lead is fixed, and said at least one mass of lead is shaped to have a substantially circular cross-section in a plane parallel to the metal plates of the absorber which are mutually substantially parallel.

* * * * *